INVENTORS
ALBERT F. HANSCHKE
DANIEL J. AIKEN
BY Daniel H. Bobis
ATTORNEY

FIG. 2

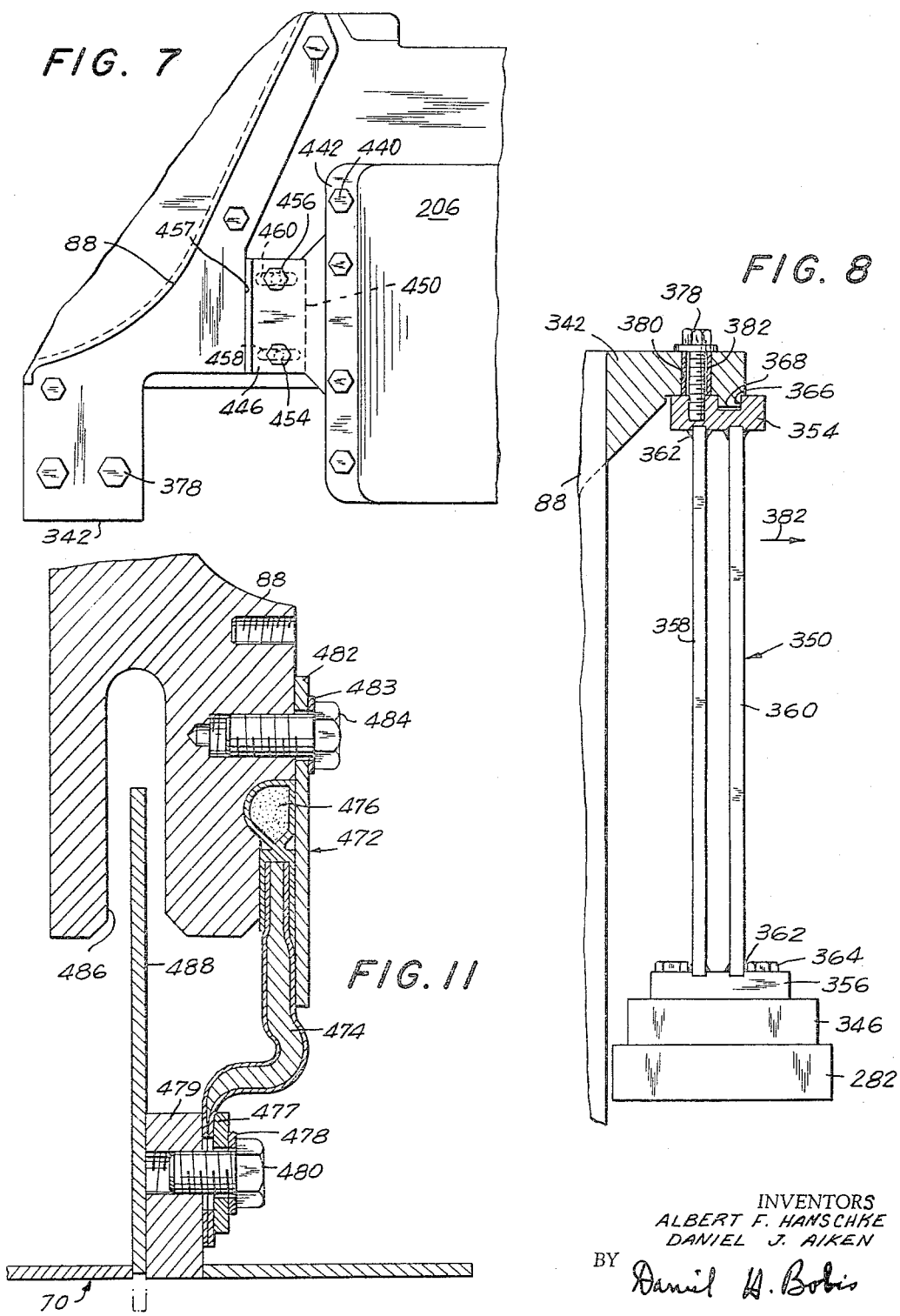

3,313,517
GAS EXPANDER TURBINES FOR POWER RECOVERY USE WITH JET TYPE, HOT GAS GENERATORS
Albert F. Hanschke, Wellsville, and Daniel J. Aiken, Belmont, N.Y., assignors to Worthington Corporation, Harrison, N.J., a corporation of Delaware
Filed Apr. 1, 1965, Ser. No. 444,665
37 Claims. (Cl. 253—39)

This invention relates to fluid turbines and, more specifically, to gas expander turbines which are particularly adaptable for use as power recovery turbines.

An object of the invention is the provision of gas expander turbines which are particularly adapted for use in the highly efficient recovery of power from the high temperature gases generated by hot gas generators.

Another object of the invention is the provision of gas expander turbines as above which are particularly adapted for use in the highly efficient recovery of power from the high temperature exhaust gases generated by hot gas generators of the jet type, as for example, somewhat modified aircraft type gas turbines.

Another object of the invention is the provision of gas expander turbines which are particularly designed for power generation use as above in conjunction with specific jet type, hot gas generators which are operating under maximum possible output conditions.

Another object of the invention is the provision of gas expander turbines comprising inlet means which make possible the use, as above, of the high temperature exhaust gases of the aircraft type gas turbines at the normally high exhaust velocities thereof without requiring the use of curved connecting pipe means and attendant losses in overall power generation efficiency.

Another object of the invention is the provision of gas expander turbines as above of double flow design comprising symmetrically designed casing and rotor means which provide for balanced gas thrust to significantly reduce gas thrust loading thereon during operation of the gas expander turbines.

Another object of the invention is the provision of gas expander turbines of double flow design as above which comprise symmetrical inner and outer casing means which are positively located at only one common central point, to maintain turbine alignment, and are independently and flexibly supported and guided to all sides of said central point with freedom for controlled independent movement therefrom to provide for independent thermal expansion at different thermal expansion rates, and attendant relative movement between said casing means to minimize distortion and prevent the development of undesirable thermal stresses therein.

Another object of the invention is the provision of gas expander turbines of double flow design as above, which comprise rotor bearing means which are supported from said inner casing means with freedom for controlled relative movement therebetween to prevent the development of undesirable thermal stresses therein.

Another object of the invention is the provision of gas expander turbines comprising symmetrical inner and outer casing means, as above, wherein said inner casing means surround said rotor means and guide said high temperature gases to and through said turbine rotor means from said hot gas generator, and said outer casing means surround said inner casing means and guide said gases from said inner casing means for exhaust to atmosphere.

Another object of the invention is the provision of gas expander turbines as above comprising flexible seals between said inner and outer casing means, whereby relative movement therebetween is permitted attendant the prevention of the leakage of said gases therefrom.

Another object of the invention is the provision of gas expander turbines which are particularly designed for power recovery use as above in the peak-shaving, end of line, emergency standby, or similarly directed generation of electrical power through the drive of electrical generator means.

Another object of the invention is the provision of gas expander turbines for electrical power generation as above which are particularly adapted for operation at A.-C. generator speeds to thus eliminate the need for reduction gearing therebetween.

Another object of the invention is the provision of gas expander turbines for use in electrical power generation as above which are capable of unusually fast starts and attendant heat-up from cold to maximum operating temperatures at full load conditions in short periods of time without the development of damaging thermal stresses in either of the casing or rotor means thereof, to thus eliminate the need for lengthy warmups or rotating reserve.

Another object of the invention is the provision of power recovery, hot gas expander turbines as shown which are designed for the highly efficient recovery of power from the high temperature exhaust gases of two jet type, hot gas generators which are operatively positioned in opposed manner relative to the gas expander turbines.

Another object of the invention is the provision of power recovery, hot gas expander turbines as above which are particularly adapted for substantially automatic and fail-safe operation, whereby the costs of operation thereof are minimized.

Another object of the invention is the provision of power recovery, hot gas expander turbines as above which are particularly adapted for use in groups thereof in compact, relatively light weight power peaking units of extremely high energy output ratings and relatively low cost.

Another object of the invention is the provision of power recovery, hot gas expander turbines as above which are particularly adapted for use in compact, self-contained, attractively packaged power peaking units which require only minimum enclosure, foundation, fuel and lubrication provisions, thus permitting rapid and economical field erection and minimizing plant investment.

Another object of the invention is the provision of power recovery, hot gas expander turbines for power peaking use as above which require no external cooling water supply and are thus ideally suited for use in areas of water scarcity.

Another object of the invention is the provision of power recovery, hot gas expander turbines for power peaking use as above which are operable on gaseous and/or liquid fuels to provide maximum fuel flexibility.

Another object of the invention is the provision of power recovery, hot gas expander turbines which are particularly adapted for use in housing-packaged power peaking units as above wherein all major hot gas generator and hot gas expander turbine components are easily and quickly accessible, whereby all maintenance work may be quickly and easily performed within said housing.

Another object of the invention is the provision of power recovery, hot gas expander turbines which are particularly adapted for use in housing-packaged, power peaking units as above for operation at minimum and unobjectionable noise levels to make practical the installation thereof in heavily populated areas.

Another object of the invention is the provision of power recovery, hot gas expander turbines as above which are of particularly durable design and construction, whereby long periods of satisfactory maintenance-free operation thereof are assured.

Another object of the invention is the provision of power recovery, hot gas expander turbines as above which are of relatively simple and economical design and construction, whereby cost of fabrication and installation thereof are minimized.

The above and other objects and advantages of the invention are believed made clear by the following detailed description thereof taken in conjunction with the accompanying drawings wherein:

FIGURE 2 is a side plan view of two of the hot gas expander turbines of FIGURE 1;

FIGURE 7 is a top view of a portion of the journal bearing case and exhaust diffuser of the hot gas expander turbine of FIGURE 4, taken in the direction of the arrow 7 in the latter figure;

FIGURE 8 is a side view of a wobble plate assembly, with portions in cross section for purposes of illustration, taken in the direction of the arrow 8 in FIGURE 4;

FIGURE 11 is an enlarged cross-sectional view of a portion of one of the flexible seal assemblies of FIGURE 5 as indicated by the arrow 11 in the latter figure.

Figure 1:
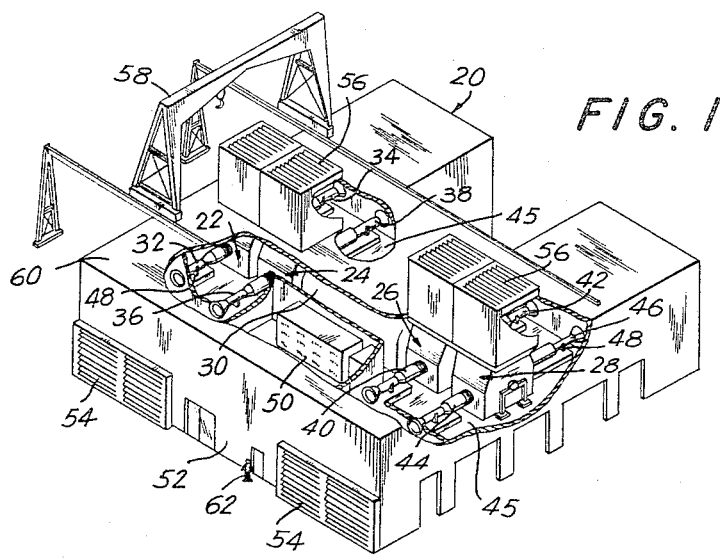
FIGURE 1 is a partially broken away perspective view of a high output, electrical power peaking unit utilizing four of the hot gas expander turbines of the invention.

Referring now to FIGURE 1 of the drawings, a packaged power peaking unit constructed in accordance with the teachings of our invention is generally indicated at 20. The said unit utilizes four of the double flow power recovery turbines of our invention, which are indicated generally at 22, 24, 26, and 28, respectively, in the subject figure, and is representative of the world's largest power peaking unit which is currently being constructed for power peaking use by applicants' assignee, the Worthington Corporation of Harrison, N.J. To this effect, it is believed of interest to note that each of the double flow power recovery turbines 22, 24, 26, and 28, respectively, of the said unit, has an output potential of 60,000 kw., thus providing the power peaking unit 20 with an output potential, at full load, of 160,000 kw. External factors, as for example, a relatively high seasonal ambient air temperature of 80° F., can reduce the maximum output potential of the said unit to 139,000 kw., which is more than sufficient to meet an expected normal power peaking load requirement, in this application, of 121,000 kw.

An A.-C. generator 30, of suitable performance characteristics, is positioned as shown midway between the double flow power recovery turbines 24 and 26, with the respective shafts of the said generator, and the four power recovery turbines, being drivingly coupled as described in detail hereinbelow, to enable the drive of the former by the latter. The generator 30 is preferably a two-pole synchronous alternator of the type manufactured by Electric Machinery Manufacturing Company, and is designed for unattended operation and direct air-cooling to eliminate the need for an external, cooling water supply. Space heaters are provided in the said generator to prevent condensate formation in cool climates and during shutdown periods to maintain the reliability and long life of all electrical insulation.

The hot exhaust gases of two, somewhat modified, aircraft type gas turbines are utilized to drive each of the said double flow power recovery turbines, again in a manner described in detail hereinbelow. The said aircraft type gas turbines are identified as 32, 34, 36, 38, 40, 42, 44, and 46, respectively, in FIGURE 1, with the exhaust ends of each pair thereof being operatively positioned as shown, in opposed manner at 180° intervals, relative to the outer casing of the particular double flow, power recovery turbine being driven thereby. In a herein disclosed preferred embodiment of our invention, the aircraft type gas turbines 32, 34, 36, 38, 40, 42, 44 and 46, each take the form of an aircraft type gas turbine of proven performance and dependability which is somewhat modified to operate as a gas generator for driving a power recovery turbine as a power peaking unit. Somewhat modified, aircraft type gas turbines of this nature are manufactured by the Pratt & Whitney Aircraft Company of Hartford, Conn., and are identified thereby as the GG4.

Since the respective high and low pressure compressors of the GG4 aircraft type gas turbines are not mechanically connected to the starting load, i.e., the A.-C. generator 30 and the respective power recovery turbines, and the coaxial shaft system of GG4 aircraft type gas turbines permit the high pressure compressor thereof to turn independently of the low pressure compressor thereof, starting loads are minimized, whereby even power peaking units of very large energy outputs in the nature of the unit 20 can be quickly started by stored compressed air driving a small, integrally mounted air-turbine starter which readily brings the high pressure compressor up to starting speed.

To this effect, air is supplied to the air-turbine starters of the said aircraft type gas turbines by a non-illustrated storage system comprising an A.-C. motor driven air compressor, receiver tanks, and a regulator, to maintain air pressure to the starter at a required level, as for example 35 p.s.i.g. Air is replenished automatically by the motor-driven compressor. This simple, compact air starting system eliminates electric starters, batteries, and battery chargers; or internal combustion engine starters with their associated fuel and maintenance requirements, to thus contribute materially to overall power peaking unit compactness and economy.

The GG4 aircraft type gas turbines are equally well adapted to operation, with minor adjustment, from either gaseous, liquid, or dual-fuel supply systems, whereby maximum fuel flexibility is provided for the power peaking unit 20.

The respective rotor shafts and casing portions of each of the double flow power recovery turbines 22, 24, 26, and 28, are supported, with freedom for limited relative movement therebetween in a manner described in detail hereinbelow, from a fixed base 45 by support means of the nature generally indicated in part at 47 in FIGURE 1. The fixed base 45 is preferably a simply and economically constructed concrete pad.

Support means 48 are provided to support each of the said aircraft type gas turbines from the fixed base 45 in a readily removable manner whereby the said gas turbines may be readily removed for periodic maintenance and/or replacement.

A switchgear and control housing 50 is provided and includes all switchgear necessary to the power peaking function of the unit 20, and all control means necessary to the control of the operation of the respective aircraft type gas turbines 32, 34, 36, 38, 40, 42, 44 and 46, the respective double flow, power recovery turbines 22, 24, 26 and 28, and the electric generator 30. The said switchgear is preferably of the fully enclosed, horizontal-drawout, metal-clad, dead-front type and contains all the equipment necessary for the complete electrical operation and protection of the power peaking unit 20. The control means may include automatic, remote, or semi-automatic controls, making possible the unattended operation of the power peaking unit 20 to minimize operational costs. The automatic controls govern operating functions such as pushbutton starting, automatic synchronizing, and voltage regulation. A local board for overriding manual control is also included. Supervisory instrumentation in the nature of protective devices which will actuate visible and/or audible alarms, or effect trip-out under abnormal operating conditions, is also included in the said control means.

A pre-fabricated, chambered metal housing 52 is provided to attractively and functionally enclose the power peaking unit 20, and includes air inlet means 54 for guiding and silencing the flow of air into the respective intakes of the aircraft type gas turbines, and exhaust means 56 for silencing the exhaust gases resulting from operation of the respective double flow power recovery turbines and directing the same to atmosphere. Thus, operation of the said unit in heavily populated areas at minimum and unobjectionable noise levels is made possible.

A traveling, overhead crane 58 is provided to facilitate the installation and removal of the respective aircraft type gas turbines and maintenance of the respective double flow, power recovery turbines, through non-illustrated hatch portions formed in the roof 60 of the housing 52. Thus, for example, the convenient replacement of one of the aircraft type gas turbines is made possible within a few hours to minimize power peaking unit downtime. The size of the housing 52 is believed clearly illustrated by the relative size of a workman as depicted at 62 in FIGURE 1.

One of the double flow, power recovery turbines, as for example power recovery turbine 26, is depicted in longitudinal and transverse cross section in FIGURES 5 and 6, respectively, it being understood that power recovery turbines 22, 24 and 28 are of the same construction as power recovery turbine 26 except where noted hereinbelow. As seen therein, the said turbine comprises an outer casing, or exhaust housing, generally indicated at 70, and an inner casing, generally indicated at 72. A rotor assembly, generally indicated at 74, is rotatably positioned as shown within the inner casing 72. The outer casing 70 is preferably constructed from stainless steels of the 400 series, while the inner casing 72 is preferably constructed from chrome molybdenum steels. The rotor assembly 74 is preferably constructed from austenitic stainless steels, as for example those designated A–286. It is to be clearly understood that the said outer and inner casings are independently supported and center guided, in a manner described in detail hereinbelow, from without the power recovery turbine 28 with freedom for controlled relative movement therebetween as might be occasioned, for example, by different rates of thermal expansion driving operation of the said power recovery turbine. It is also to be clearly understood that the said rotor assembly is supported and guided from the said inner casing with freedom for controlled relative movement therebetween, again in a manner described in detail hereinbelow.

Figure 2:
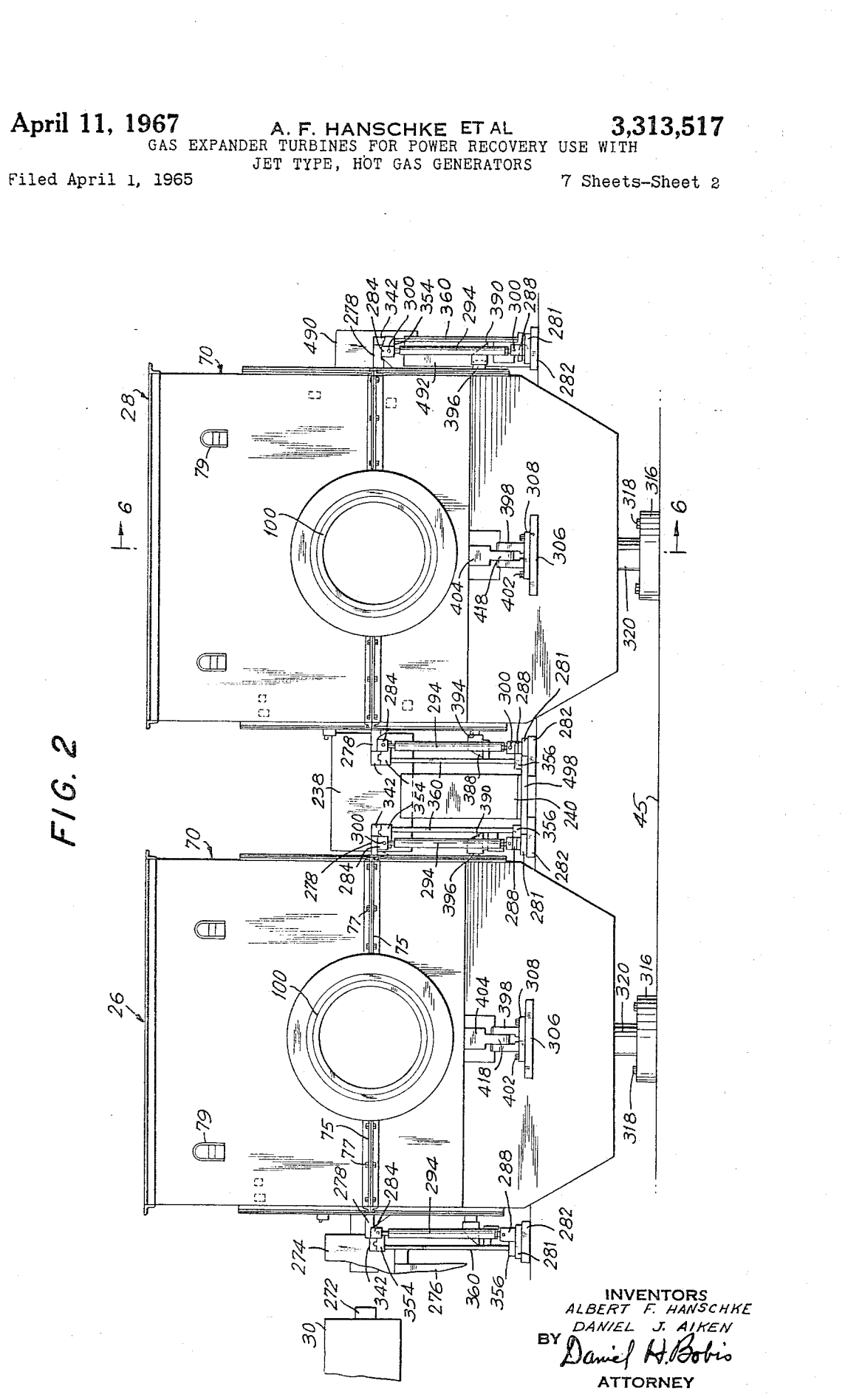

The outer casing 70 includes an outer case cover 76 with sheets of any suitable, thermal and acoustical insulative material 78, as for example asbestos, positioned therebetween through the use of insulation angle fastening members 80. Studs 82 (FIGURE 6) are provided to extend across the upper portion of the said outer case to provide structural rigidity for the said portion. Drain plugs 83 (FIGURE 5) are provided to extend across the upper portion of the said outer case to provide structural rigidity for the said portion. Drain plugs 83 (FIGURE 5) are provided to extend as shown through the lower walls of the outer case 70 and outer case cover 76 to enable the periodic drain of condensate therefrom. The outer casing 70 is preferably split into halves along a horizontal plane and includes attachment flanges 75 formed thereon and attachment bolts 77 extending therethrough as shown in FIGURE 2. Handles 79 are provided on the upper half of the outer casing 70 to facilitate the removal thereof, as for power recovery turbine maintenance, upon the removal of the attachment bolts 77.

The inner casing 72 comprises a torus-like gas inlet case 84, with exhaust diffusers 86 and 88, respectively, secured to the said gas inlet case adjacent opposite extremities thereof by threaded studs 90 (FIGURE 5) extending therebetween. Barrel transition pieces 92 and 94 (FIGURE 6) are affixed as shown to opposite extremities of the gas inlet case 84 by threaded bolts 96 extending therebetween. Cylindrrical, inlet spacer members 98 and 100 are affixed to the remote extremities of the said barrel transition pieces by threaded bolts 102 extending therebetween. The said spacer members extend as shown through apertures provided therefor in the outer casing cover 76 to provide for the readily removable connections of the exhaust ends of the aircraft type gas turbines 40 and 42 thereto, in a non-illustrated manner, to enable the flow of the hot exhaust gases from the said aircraft type gas turbines into the gas inlet case 84. Thus it may be understood, whereby direct entry of the said exhaust gases, at the inherently high exhaust temperatures and velocities thereof, into the power recovery turbine 26 is made possible to eliminate the need for curved connecting pipe means and attendant losses in overall efficiency. Thermal and acoustical insulative material 101, of the nature of insulative material 78, is positioned as shown around corresponding portions of the exhaust diffusers 86 and 88 by insulation covers 103 and 105 extending thereover.

Volute-like, inner case liners 104 and 105, respectively (FIGURE 6) are positioned as shown within the gas inlet case 84 and the respective barrel transition pieces 92 and 94. The said inner case liners are flexibly supported and guided from the said gas inlet case and barrel transition pieces by flexible, spring-like spacer flanges 108 (FIGURE 5), and spacer members 110 and 112 (FIGURE 6) positioned therebetween as shown. In addition, guide flanges 114 (FIGURE 6) extend from the said inner case liners into guide grooves 116 provided therefor in the barrel transition pieces 92 and 94, with clearance therebetween, to further maintain the said liners in the proper positions thereof while enabling the guided movement of the said liners relative to the said gas inlet case and barrel transition pieces.

Spaced apertures 118 (FIGURE 6) are provided as shown in the inner case liners 104 and 106 and function to equalize the gas pressure between the respective interior portions of the said inner case liners and the remaining interior portions of the gas inlet case 84 not occupied by the said liners. Thus, gas pressure loading of the said inner case liners is prevented, whereby the same may be satisfactorily manufactured from relatively light sheet metal, with the more substantially constructed gas inlet case 84 and barrel transition pieces 92 and 94, being utilized to effectively withstand the said gas pressure loadings. It is to be understood, however, that once normal operating conditions are reached by the power recovery turbine 26 the gas pressure within and without the inner case liners 104 and 106 will have substantially equalized, whereby very little, if any, further hot gas flow through the said apertures will occur. Thus, the apertures 118 will not present any significant obstacles to the smooth flow of the hot gases through the said inner case liners. Handles 120 are provided as shown on the inner case liners 104 and 106 to facilitate the handling thereof upon disassembly of the gas inlet case 84.

A radial nozzle blade assembly, generally indicated at 122, is positioned as shown, adjacent the inner peripheries of the gas inlet case 84 and the inner case liners 104 and 106, respectively. The said nozzle blade assembly comprises a generally circular array of adjustably positionable, radial nozzle blades 124 which are adjustably supported as shown adajcent the said inner periphery of the gas inlet case 84, with clearance therebetween, by support bolts 126 extending therethrough. The nozzle blade assembly 122 is preferably of the nature described in detail in the copending application for U.S. patent entitled, "Radial Nozzle Blade Assembly," Serial No. 409,229, filed November 5, 1964, by A. F. Hanschke and W. W. Browning, now Patent No. 3,263,963, and assigned to the assignee hereof. It is thus considered sufficient for purposes of this application to note that the radial nozzle blades 124 function, upon the flow of the hot gases exhausted from the aircraft type gas turbines 40 and 42 thereto through the inlet spacer members 98 and 100, and the inner case liners 104 and 106, to direct the said hot gases, under proper pressure and velocity characteristics to the rotor assembly 74 of the double flow, power recovery turbine 26.

Generally circular arrays of spaced, support struts 128 and 130, respectively (FIGURE 5) of suitable aerodynamic configuration extend as shown across the respective gas flow passages 136 and 138 of the exhaust diffusers 86 and 88. Generally circular arrays of spaced, exhaust turning vane assemblies, as generally indicated at 144 and 146, respectively, are supported as shown in the said gas flow passages adjacent the said support struts, by support bolts 152 extending therebetween. The said exhaust turning vane assemblies are each preferably of the nature described in detail in the copending application for U.S. patent entitled "Fluid Turning Vane Assemblies," Ser. No. 428,688, filed January 28, 1965, by A. H. Tuttle and E. L. Clark, and assigned to the assignee hereof. It is thus considered sufficient for purposes of this application to note that each of the said exhaust turning vane assemblies comprise a plurality of spaced, exhaust turning vanes 154 which function to turn the hot gases after the flow thereof through the flow passages 136 and 138 of the exhaust diffusers 86 and 88, and properly direct the said gases to the interior of the outer casing 70 for the flow thereof to the atmosphere through the open upper end of the said outer casing, and the exhaust silencing means 56 (FIGURE 1) in the direction indicated by the arrows 156 in FIGURE 5.

Figure 5:
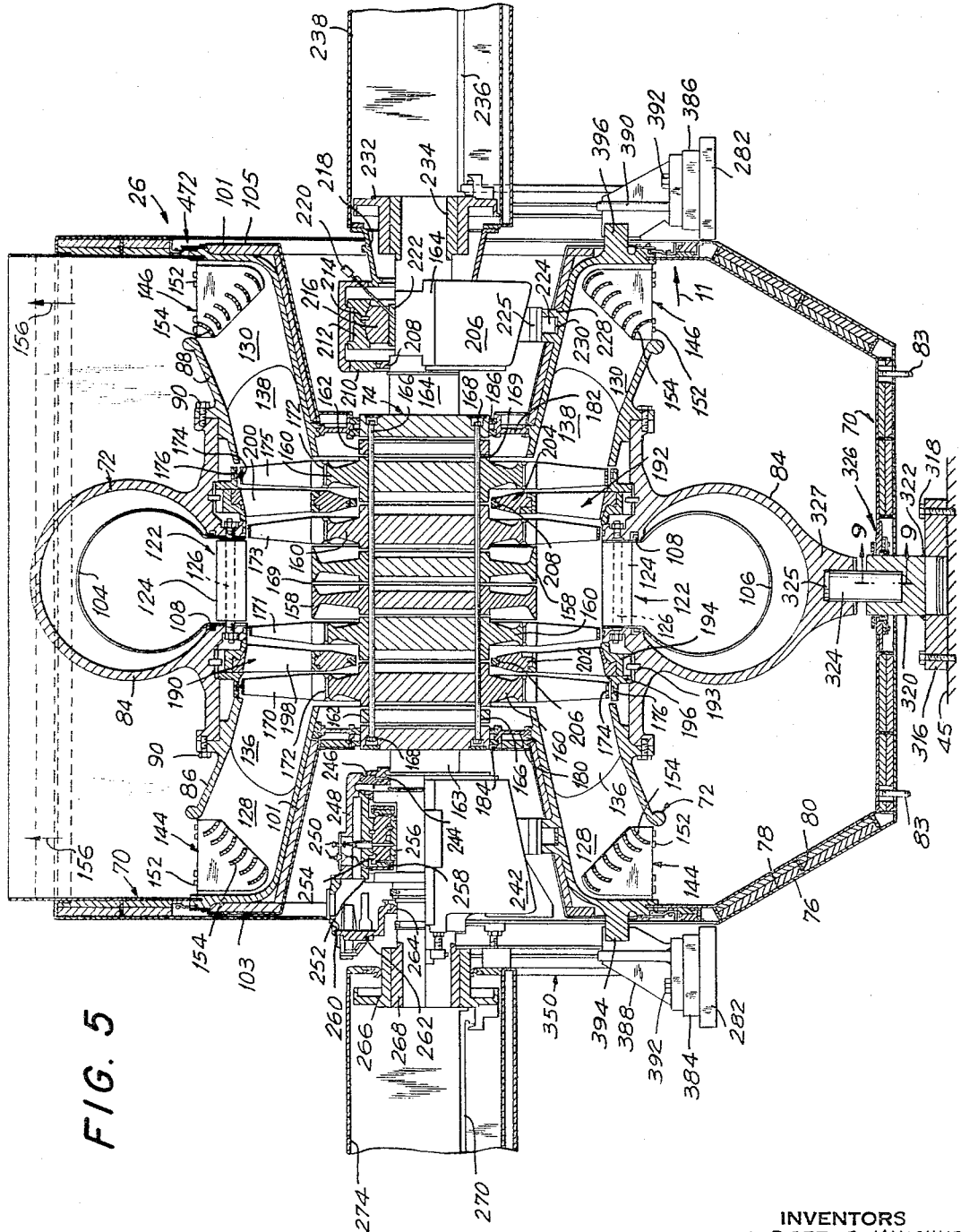
FIGURE 5 is a vertical cross-sectional view of one of the hot gas expander turbines of FIGURE 2 taken along the axis of the rotor means thereof.

The rotor assembly 74 is of stacked construction and comprises two centrally located spacer discs 158, with two turbine wheels 160, a rotor spacer ring 162, and stub shafts 163 and 164, respectively, positioned as shown to either side of the said spacer discs in the manner clearly illustrated in FIGURE 5. The said spacer discs, turbine wheels, spacer rings and stub shafts of the rotor assembly 74 are maintained in the depicted relative positions thereof by thru bolts 166, which extend as shown through aligned bores formed therein, and lock nuts 168 which are threadably attached to the said thru bolts adjacent the respective extremities thereof. Curvic couplings, i.e. precision ground radial teeth or face splines, as indicated at 169, are formed on the mating surfaces of the respective spacer discs, turbine wheels, spacer rings and stub shafts to transmit torque evenly therebetween and maintain perfect alignment thereof upon the tightening of the lock nuts 168 on the thru bolts 166.

The stacked construction of the roller assembly 74 permits the advantageous use of forged, high-temperature alloys in the respective spacer discs, turbine wheels, and rotor spacer rings, and low-alloy steels in the respective stub shafts wherein good journal quantities are required. In addition, the curvic couplings as indicated at 169 act as heat dams to reduce heat conduction to the journalled portions of the respective stub shafts 163 and 164. The said stacked construction also allows very fast starts and abrupt load changes, and results in an extremely stiff rotor assembly design which places the critical speed thereof well above normal operating speeds.

Circular arrays of turbine buckets 170, 171, 173 and 175, respectively, are mounted, in generally conventional, side entry fir tree manner as indicated at 172, on the respective peripheries of the turbine wheels 160, and extend as shown into the exhaust diffuser flow passages 136 and 138 for the extraction of useful work from the hot gases flowing through the said passages.

Generally conventional tip shrouds and sealing members 174 are affixed, in generally conventional manner, to the respective tips of the said turbine buckets, and function to lend structural rigidity to the said turbine buckets and, in cooperation with generally conventional honeycomb sealing elements 176 which are positioned closely adjacent thereto in the walls of the gas inlet case 84, to provide a rotating seal to prevent the hot gases from bypassing the said turbine buckets.

Generally cylindrical packing cases 180 and 182 extend radially inward as shown (FIGURE 5) from the respective exhaust diffusers 86 and 88, toward the respective stub shafts 163 and 164. Labyrinth packing glands 184 and 186 are respectively carried from the said packing cases and cooperate with the adjacent rotating peripheries of the said stub shafts to provide rotating seals at these points. Cylindrical, segmented diaphragm assemblies, generally indicated at 190 and 192, are supported and guided as shown (FIGURE 5) from the gas inlet case 84 by alignment pins 193, retaining rings 194 and retaining plates 196, respectively. The said segmented diaphragm assemblies are each preferably of the nature described in detail in the copending application for U.S. patent entitled, "Segmented Diaphragm Assemblies," Ser. No. 411,821, filed Nov. 17, 1964, by W. W. Browning and A. H. Tuttle, and assigned to the assignee hereof. It is thus considered sufficient for purposes of this application to note that the segmented diaphragm assembly 190 comprises a circular array of stator or nozzle vanes 198 which extend as shown into gas flow passage 136 of exhaust diffuser 86 between the turbine buckets 170 and 171, respectively, while the segmented diaphragm assembly 192 comprises a circular array of stator or nozzle vanes 200 which extend as shown into the gas flow passage 138 of exhaust diffuser 88 between the turbine buckets 173 and 175, respectively.

Retaining discs 202 and 204, and labyrinth packing rings 206 and 208, are respectively supported as shown from the radially inner tips of the nozzle vanes 198 and 200, with the said packing rings functioning, in cooperation with the adjacent peripheries of the turbine wheels 160, at the respective curvic coupling portions thereof, to form rotating seals with the rotor assembly 74 to prevent the bypassing of the said nozzle vanes, by the hot gases during the flow thereof through the said flow passages.

The stator or nozzle vanes 198 and 200 function to redirect the hot gases, under proper pressure and velocity conditions, for the flow thereof between the turbine buckets 170 and 175 of the respective circular arrays thereof, after the flow of the said hot gases between the turbine buckets 171 and 173 of the respective circular arrays thereof.

A journal bearing case is indicated at 206 in FIGURE 5 and is supported, in a manner described in detail hereinbelow, from the exhaust diffuser 88 of the inner casing 72 with freedom for controlled relative movement therebetween. The said journal bearing case includes a diaphragm adapter 208, an oil baffle 210, an outer adapter ring 212, a stop pin 214, a bearing shell 216, a baffle adapter 218, a thermocouple 220, and an insert bearing 222 relatively positioned therein as shown, with the function of the said insert bearing being to rotatably support the stub shaft 164 of the rotor assembly 74. Centering guides 224 are keyed into the journal bearing case 206 as indicated at 225, and extend radially outward therefrom into guide apertures formed in bosses 228 which extend from the exhaust diffuser 88 toward the said journal bearing case. Radial clearance is provided, as indicated at 230, between the extremities of the said centering guides and the bottoms of the said guide apertures to enable guided relative radial movement therebetween as discussed above.

A coupling hub 232, and a coupling key 234 are attached as shown to the stub shaft 164 adjacent the remote extremity thereof, and a coupling as indicated at 236 is attached to the said coupling hub to couple the said stub shaft to the non-illustrated stub shaft 163 of the adjacently positioned power recovery turbine 28 (FIGURES 1 and 2). A coupling housing 238 is provided to protectively enclose the said coupling, and is supported in the depicted position thereof by a support member 240 as seen in FIGURE 2.

The thermocouple 220 is utilized in cooperation with the control means incorporated in the control housing 50 (FIGURE 1) to monitor the operation of the insert bearing 222 and provide immediate indication, and/or automatic shutdown of the power peaking unit 20 (FIGURE 1), upon overheating of the said bearing.

A thrust bearing case is indicated at 242 (FIGURE 5) and is supported, again in a manner described in detail hereinbelow, from the exhaust diffuser 86 with freedom for controlled relative movement therebetween. The said thrust bearing case includes an oil deflector and baffle 244, a diaphragm adapter 246, a bearing case cap 248, a thermocouple 250, an outer adapter ring 252, a bearing shell 254, an insert bearing 256, and a thrust bearing shoe 258 relatively positioned therein as shown, with the function of the said insert bearing 256 and thrust bearing shoe 258 being to rotatably support the stub shaft 163 of the rotor assembly 74 and to absorb any thrust exerted thereon by operation of the power peaking unit 20 (FIGURE 1). The thermocouple 250 is utilized in the same manner as the thermocouple 220 of the journal bearing case 206.

An overspeed trip case 260 and a cover plate 262 enclose overspeed detecting means, as indicated at 264, which function, in cooperation with the control means incorporated in the control housing 50 (FIGURE 1) to provide immediate indication and automatic shut-down of the power peaking unit 20 upon overspeeding of the turbine rotor assembly 74 and thus insure complete safety in the operation of the rotor assembly 74.

In addition, suitable non-illustrated governor means are provided to sense generator speed and regulate the flow of fuel to the respective aircraft type gas turbines accordingly. Also, non-illustrated sensing and control means are provided to effect immediate indication and automatic shutdown of the power peaking unit 20 upon the occurrence of incomplete sequence, excess vibration, low pressure or electrical malfunction conditions. In case of fire, non-illustrated thermostatically operated detecting means effect an immediate shut-down of the power peaking unit 20, and actuate a non-illustrated, carbon dioxide system to quickly extinguish flames and protect plant investment.

A centering guide 261 is keyed into the thrust bearing case 242 as indicated at 263 and extends radially outward therefrom into a guide aperture in a boss 263 on the exhaust diffuser 86 with radial clearance provided therebetween as indicated at 265. The centering guide 261 functions in the same manner as the centering guide 224 on the journal bearing case 206.

An expander coupling hub 266, and a coupling key 268 are attached as shown to the stub shaft 163 adjacent the remote extremity of the latter, and a coupling as indicated at 270 is attached to the coupling hub 266 to couple the stub shaft 163 to a non-illustrated flexible coupling which is in turn coupled to the shaft 272 (FIGURE 2) of the adjacently positioned generator 30. A coupling housing 274 is provided to protectively enclose the coupling 270 and the non-illustrated flexible coupling, and is supported by a support member 276 as seen in FIGURE 2. The said flexible coupling makes possible the relatively gradual bringing of the generator 30 up to power recovery turbine speed, i.e., 3600 r.p.m., to prevent the development of undue stresses in the power recovery turbines 22, 24, 26 and 28 (FIGURE 1) at the commencement of operation of the power peaking unit 20.

In power peaking units of the nature of unit 20, two non-illustrated lubrication systems are provided, one of which supplies a synthetic aircraft-turbine oil to the respective aircraft type gas turbines 32–46, and the other of which supplies a standard turbine-quality mineral oil to the bearing cases 206 and 242 of the respective power recovery turbines 22, 24, 26 and 28, and to the bearings of the generator 30.

The manner of operation of the power recovery turbine 26 may now be understood to be as follows. The high temperature and high velocity exhaust gases from the aircraft type gas turbine 40 enter the said power recovery turbine through the inlet spacer member 98 and flow therefrom through the volute-like inner case liner 104 to the upper half of the circular array of radial nozzle blades 124, while the correspondingly high temperature and high velocity exhaust gases from the aircraft type gas turbine 42 simultaneously enter the power recovery turbine 26 through the inlet spacer member 100 and flow therefrom through the volute-like inner case liner 106 to the lower half of the circular array of radial nozzle blades 124. The said gases flow generally radially between the said nozle blades and are then split and turned 90° in opposite directions to flow axially without losses beyond normal nozzle losses. After passing between the said radial nozzle blades, the gases expand tangentially to the rotor assembly 74, and then expand axially in opposite directions through the respective arrays of turbine buckets 170 and 171, and 173 and 175, whereby the energy in the said gases is converted to 3600 r.p.m. rotor shaft power. The gases are then exhausted from the exhaust diffusers 86 and 88 into the outer casing 70 for the flow therefrom to atmosphere as described hereinabove.

Figure 3:
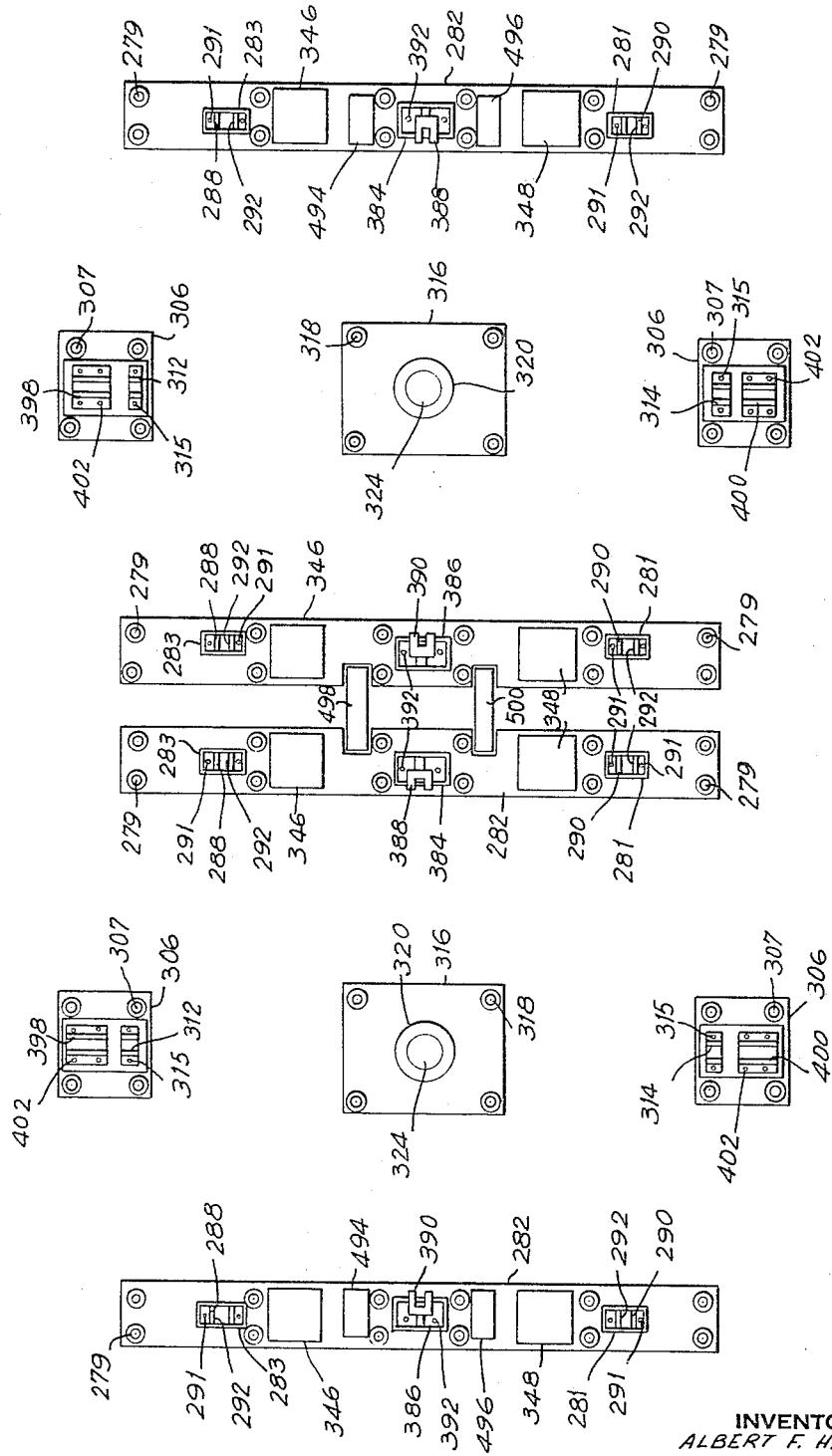
FIGURE 3 is a top plan view of the mounting means utilized to support the hot gas expander turbines of FIGURE 2.
Figure 4:
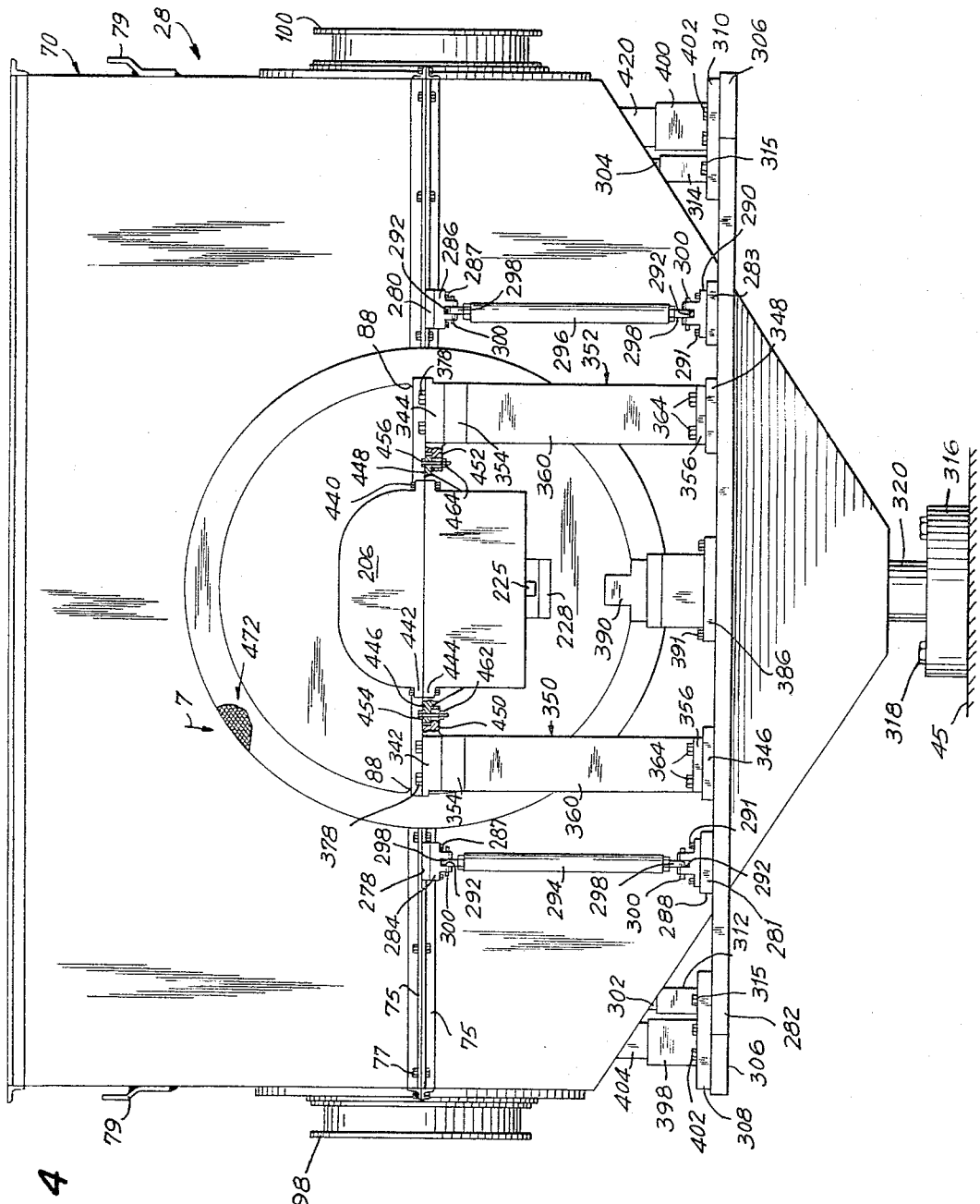
FIGURE 4 is an end plan view of one of the hot gas expander turbines of FIGURE 2.

The respective manners in which the outer casing 70 and inner casing 72 of the respective power recovery turbines 22, 24, 26 and 28, are independently supported and guided with freedom for controlled relative movement between the said casings, will now be described in detail with reference to power recovery turbines 26 and 28, it being understood that the said casings of the power recovery turbines 22 and 24 are supported and guided in the same manners. To this effect, a spaced pair of support flanges, 278 and 280 (FIGURES 2 and 4) extend longitudinally from each end face of the outer casings 70 of the power recovery turbines 26 and 28. Four spaced soleplates 282 extend transversely of the said power recovery turbines as best seen in FIGURES 2, 3, 4, beneath the support flanges 278 and 280. The soleplates 282 are fixedly supported in the depicted positions thereof from the fixed base 45 of the housing 52 by non-illustrated support pedestals extending therebetween, and may be fixedly located on said support pedestals by attachement bolts 279 extending therethrough.

Spaced, support platforms 281 and 283 are fixedly secured to the said soleplates, as for example by welding. Support blocks 284 and 286 are bolted to the support flanges 278 and 280, respectively, by attachment bolts 287, and support blocks 288 and 290 are bolted to the support platforms 281 and 283, respectively, by attachment bolts 291.

Sockets 292 are formed in each of the support blocks 284, 286, 288 and 290, respectively. Support posts 294 and 296, each of which includes a ball-like attachment member 298 formed at the respective extremities thereof, extend as shown between the said support blocks with each of the ball-like attachment members 298 positioned as shown in one of the sockets 292. Aligned bores are formed in the said ball-like attachment members, and the walls of the said sockets, and attachment pins 300 are provided to extend as shown through the said bores to rotatably secure the said ball-like attachment members in the said sockets. Thus may be readily understood whereby the support posts 294 and 296 will function to support the weight of the respective outer casings 70, while at the same time permitting guided thermal growth thereof through the rotation of the ball-like attachment members 298 about the attachment pins 300 and attendant canting of the support posts 294 and 296.

Figure 6:
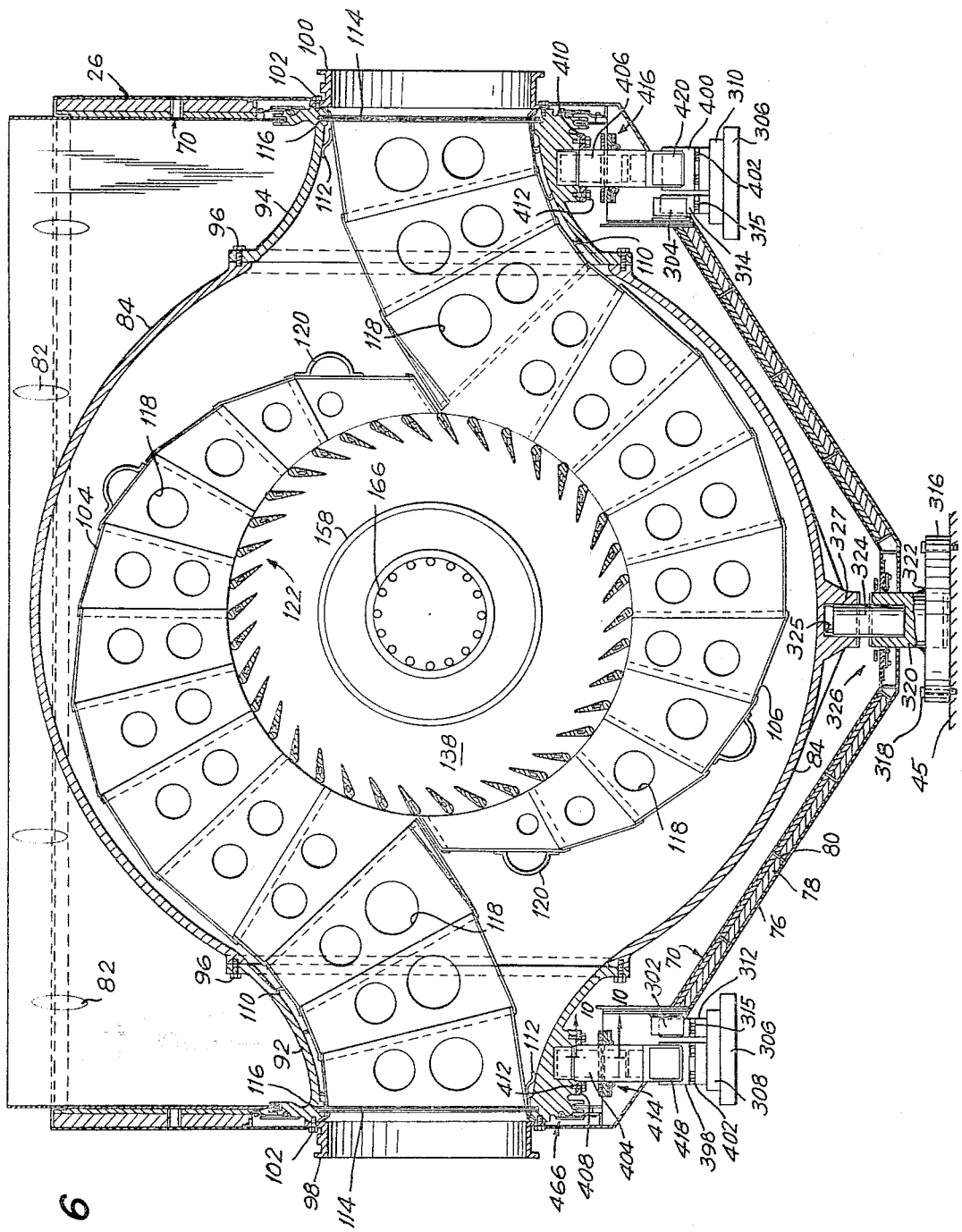
FIGURE 6 is a cross-sectional view of one of the hot gas expander turbines taken along the line 6—6 in FIGURE 2.

In addition, guide flanges 302 and 304, respectively, extend transversely from the outer casings 70 in the manner best seen in FIGURE 6. Soleplates 306 are located below the guide flanges 302 and 304, and are supported in the depicted position thereof from the fixed base 45 of the housing 52 (FIGURE 1) in the manner of the soleplates 282, through the use of attachment bolts 307 (FIGURE 3.)

Support platforms 308 and 310 are fixedly secured to the respective soleplates 306, as for example by welding, and female guide members 312 and 314 are in turn bolted to the respective support platforms 308 and 310 by attachment bolts 315, to extend upwardly therefrom in the manner best seen in FIGURE 6. The guide flanges 302 and 304 extend slidably into the respective female guide members 312 and 314 with clearance therebetween, to limit longitudinal movement of the outer casing 70 at these points, while permitting guided, transverse growth of the said outer casing due to the slidable nature of the connections between the said guide flanges and guide members, respectively.

A centrally located soleplate 316 is provided for each of the power recovery turbines 26 and 28, and is fixedly supported in the depicted position thereof by attachment bolts 318 which extend therethrough into the fixed base 45 of the housing 50. A centering pin support 320 extends upwardly as best seen in FIGURE 6 from a mounting bore provided therefor in the soleplate 316 and is fixedly secured to the said soleplate by welding as indicated at 322. A centering pin 324 is slidably positioned in a mounting bore 325 (FIGURE 7) provided therefor in the centering pin support 320 and extends upwardly therefrom into slidable contact with the walls of a locating bore 325 formed therefor in a boss 327 which extends theretoward from the bottom of the gas inlet case 84, for purposes described in detail hereinbelow.

Figure 9:
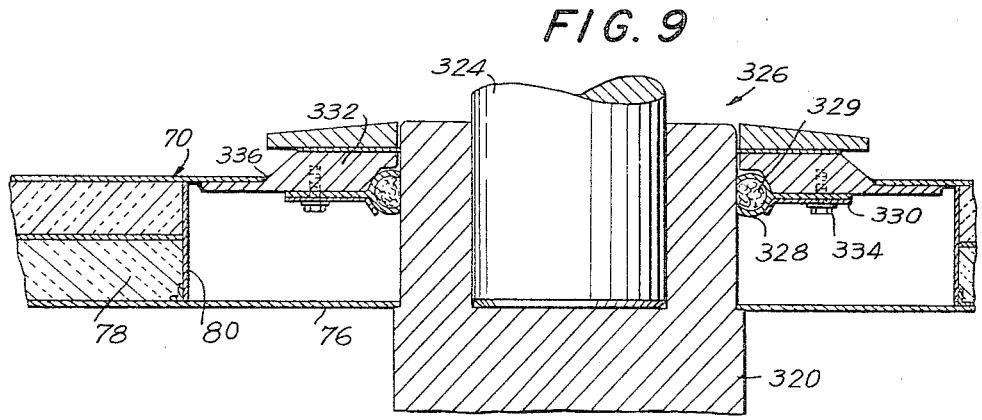
FIGURE 9 is a cross-sectional view of a centering pin seal assembly taken along line 9—9 in FIGURE 5.

A guide centering pin seal assembly, generally indicated 326 in FIGURE 6, is provided at the point where the centering pin support 320 passes through the outer casing 70 and outer casing cover 76. The said centering pin seal assembly is depicted on a larger scale in FIGURE 9 and may be seen therein to comprise a generally cylindrical, flexible seal 328 of any suitable material, as for example, asbestos, which includes flexible wire core 329 and is enclosed as shown by a cover 330 of any suitable metal, as for example #410 stainless steel. The said seal and seal cover are fixedly secured to a generally cylindrical seal mounting member 332 by attachment bolts 334 extending therebetween, with the said seal mounting member being fixedly secured in turn to the outer casing 70, in an overlapping manner in a suitable aperture provided therefor, by welding as indicated at 336. A generally cylindrical seal plate 338 is positioned as shown above the seal mounting member, and a seal plate gasket 340 of any suitable material, as for example compressed asbestos, is positioned between the said seal plate cover and seal mounting member and secured thereto in any convenient manner, as for example by bonding.

Each of the flexible seal 328, and the flexible wire core 329, the seal cover 330, and the seal plate gasket 340, extend as shown into sliding contact with the periphery of the centering pin support 320. Thus may be readily understood whereby an effective seal is provided at this point to prevent the escape of the exhaust gases from the outer casing 70 around the periphery of the said centering pin support. In addition, the surface contact between the said centering pin support, and the said flexible seal, seal cover, and seal plate gasket, respectively, provide a positive centering guide about a fixed central point for the outer casing 70 to maintain the latter properly aligned during operation of the power recovery turbine 26 and minimize distortion thereof. Thus, central location of the outer casing 70 is assured, while controlled thermal growth thereof, to prevent the undesirable development of thermal stresses therein, is made possible in each of the vertical, transverse and longitudinal directions by the slidable cooperation between the seal assembly 326 and the fixed centering pin support 320, the slidable cooperation between the guide flanges 302 and 304 and the female guide members 312 and 314, and the rotatable connection of the ball-like attachment members 298 on the support posts 294 and 296 in the sockets 292 of the fixed support blocks 284, 286, 288 and 290, respectively.

The inner casings 72 of the power recovery turbines 26 and 28 are supported from the fixed base 45 by the respective exhaust diffusers 86, and 88 of the said inner casings. To this effect, a pair of spaced, support flanges 342 and 344 are integrally formed on each of the said exhaust diffusers to extend longitudinally from the walls thereof in the manner illustrated in FIGURES 4, 7, and 8 for the exhaust diffuser 88 of the power recovery turbine 28. Each pair of support flanges 342 and 344 extend above one of the soleplates 282, and support platforms 346 and 348 are fixedly secured in any convenient manner, as for example by welding, to the said soleplate directly beneath the respective support flanges 342 and 344.

Wobble plate assemblies as generally indicated at 350 and 352 (FIG. 4) extend as shown between each support flange 342 and support platform 346, and each support flange 344 and support platform 348, respectively, to thus support the inner casings 72 of the power recovery turbines 26 and 28 from the soleplates 282.

A wobble plate assembly 350 is depicted in detail in FIGURE 8 and may be seen therein to comprise upper and lower bearing blocks 354 and 356, respectively. Aligned pairs of notches are formed as shown in the said upper and lower bearing blocks, and spaced support plates 358 and 360 extend as shown between the said upper and lower bearing blocks, with the respective extremities of the said support plates projecting into the said notches. The said support plates are fixedly secured to the said upper and lower bearing blocks in any convenient manner, as for example by welding as indicated at 362, to thus provide a functionally integral and inherently flexible wobble plate assembly.

The lower bearing block 356 is fixedly secured to the support platform 346 by attachment bolts 364 projecting therebetween. A guide notch 366 is formed in the upper surface of the upper bearing block 354, and a complementary shaped projection 368 is formed on the lower surface of the support flange 342 and extends as shown into the said notch with clearance therebetween as best seen in FIGURE 8. Attachment bolts 378 extend as shown with clearance through enlarged bores 380 in the support flange 342, into threaded bores provided therefor in the upper bearing block 354. Sleeves 382 are positioned in the enlarged bores 380 around the attachment bolts 378. The clearance between the said attachment bolts, sleeves, and enlarged bores, and between the projection 368 and guide notch 366, enable thermal growth of the support flange 342 relative to the upper bearing block 354. Further, the flexibility inherent in the spaced support plate construction of the wobble plates 350 makes possible limited, flexing thereof about the soleplates 282 in the direction indicated by the arrow 382 in FIGURE 8, whereby independent, controlled thermal growth of the inner casings 72 of the respective power recovery turbines is made possible for preventing the development of undesirable thermal stresses in the said inner casings during operation of the said power recovery turbines.

The slidable projection of the centering pin 324 into the locating bore 325 of the gas inlet case 84 provide a positive centering guide about a fixed central point for the inner casing 72 to maintain the latter properly aligned during operation of the power recovery turbine and minimize distortion of the said inner casing. The said fixed central point is the same point about which the outer casing 70 is positively centered, whereby may be understood that both the said inner and outer casings are positively located about a common central point and the relative alignment thereof maintained despite the independent thermal growth thereof.

Centrally located support platforms 384 and 386 are fixedly secured to the soleplates 282, as by welding, at opposite ends of each of the power recovery turbines, and female guide members 388 and 390, respectively, are fixedly positioned atop the said support platforms by attachment bolts 391 extending therebetween.

Guide flanges 394 and 396 project longitudinally from the respective exhaust diffusers 86 and 88 of the inner casing 72 of each of the power recovery turbines, and extend therefrom, with suitable clearances, into the respective female guide members 388 and 390 in the manner best seen in FIGURE 5, to provide guidance for the independent thermal growth of the said inner casings in the longitudinal directions.

Figure 10:
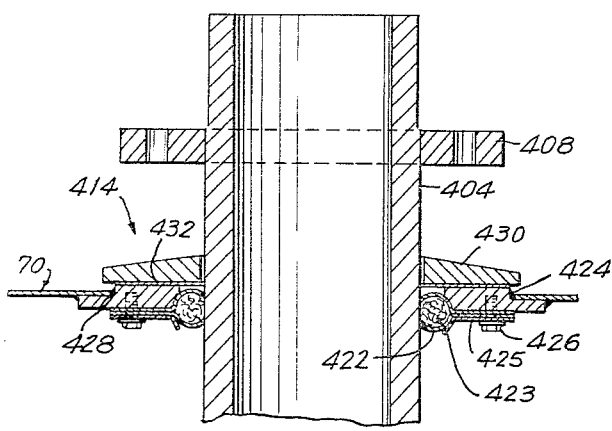
FIGURE 10 is a cross-sectional view of a guide post seal assembly taken along line 10—10 in FIGURE 6.

Female guide members 398 and 400 are fixedly positioned atop the support platforms 308 and 310 (FIGURES 3, 4 and 6) by attachment bolts 402 extending therebetween. Guide posts 404 and 406 are attached to the respective barrel transition pieces 92 and 94 by attachment plates 408 and 410 (FIGURE 6) and attachment bolts 412 extending therebetween. The said guide posts extend as shown through apertures prvoided therefor in the inner casing 70 with guide post seal assemblies 414 and 416, respectively, positioned therearound as described in detail hereinbelow with reference to FIGURE 10. The guide posts 404 and 406 include guide members 418 and 420 which are formed at the remote extremities thereof and extend as shown (FIGURE 6) with suitable clearances into the respective female guides 398 and 400 to thus provide guidance for the independent thermal growth of inner casings 72 of the respective power recovery turbines in the transverse and vertical directions.

Guide post seal assemblies for the guide posts 404 and 406 are indicated generally at 414 and 416, respectively, in FIGURE 6. The guide post seal assembly 414 is depicted in detail in FIGURE 10 and, as seen therein, comprises a generally cylindrical flexible seal 422 of any suitable material, as for example asbestos cloth, which encloses a flexible wire core 423, and is attached to a generally cylindrical seal mounting member 424 by a seal cover 425 and attachment screws 426 extending therebetween. The said seal attachment member is in turn supported in a suitable aperture provided therefor in the outer casing 70 by welding as indicated at 428. A generally cylindrical seal cover 430 fits around the guide post 404 as shown above the seal mounting member 424, and a generally cylindrical seal plate gasket 432 of any suitable material, as for example compressed asbestos, is positioned as shown around the said guide post between the said seal cover and the said seal mounting member. Each of the seal plate gasket 432 and the flexible seal 422 extend as shown into sliding contact with the periphery of the guide post 404 whereby relative movement between the barrel transition piece 92 and the inner casing 72 and the outer casing 70, is made possible.

The manner in which the journal bearing case 206 of the power recovery turbine 28 is supported from the exhaust diffuser 88 of the said power recovery turbine with freedom for controlled relative movement therebetween, is believed made clear by FIGURES 4 and 7. As seen therein, the journal bearing case 206 is constructed in two halves which are joined, along a horizontal plane, by nut and bolt assemblies 440 which extend through attachment flanges 442 and 444 formed on the said journal bearing case.

Integral support flanges 446 and 448 extend transversely as shown from opposite sides of the journal bearing case 206, and integral support flangse 450 and 452 extend as shown from the exhaust diffuser 88 on opposite sides of the said journal bearing case beneath the said support flanges 446 and 448. The lower surfaces of the respective support flanges 446 and 448 rest on, and are supported from, the upper surfaces of the respective support flanges 450 and 452, as shown (FIGURE 4) to thus support the said journal bearing case from the said exhaust diffuser. Clearances 457 and 459, respectively, are provided between adjacent walls of the said support flanges to enable relative thermal growth of the exhaust diffuser 88 in the radially inward direction and/or relative thermal growth of the journal bearing case 206 in the radially outward direction. Two spaced, guide and attachment bolts 454 and 456 extend as shown through bores provided therefor in each of the support flanges 446 and 448, and therefrom through transversely enlarged bores 458 and 460 provided therefor in each of the support flanges 450 and 452 of the exhaust diffuser 88. The said attachment bolts are tightened against the said support flanges by nuts 462 and 464 threadably secured to the respective lower extremities thereof.

It is to be understood that the thrust bearing case 242 of the power recovery turbine 28 is supported from the exhaust diffuser 86 thereof in same manner as just described for the support of the journal bearing case 206 from the exhaust diffuser 88, as are the respective journal and thrust bearing cases of the power recovery turbines 22, 24, and 26. Thus is believed made clear whereby the respective thrust and journal bearing cases of each of the power recovery turbines are supported from the respective exhaust diffusers thereof with freedom for relative controlled movement therebetween to prevent the development of undesirable thermal stresses in the respective exhaust diffusers and bearing cases upon the thermal growth thereof attendant the operation of the power recovery turbines.

Since the respective inner and outer casings 70 and 72 of each of the power recovery turbines 22, 24, 26, and 28 are independently supported and guided, with freedom for controlled relative movement therebetween as described in detail hereinabove, flexible seals are provided at the junctures of the said inner and outer casings to permit the said controlled, relative movement while, at the same time, substantially preventing the escape of the hot gases from the said outer casings at the said junctures.

In addition to the flexible seals 326, 414 and 416, the construction and manners of operation of which are described in detail hereinabove, four other flexible seals are provided. The said other seals are each of the same, generally cylindrical construction with two of the said seals being located between the respective barrel transition pieces 92 and 94 of the inner casings 72, and the outer casings 70, as indicated generally at 466 and 468 in FIGURE 6, and the remaining two of the said seals being located between the respective exhaust diffusers 86 and 88 of the inner casings 72, and the outer casings 70, as indicated generally at 470 and 472 in FIGURE 5.

One of the said generally cylindrical seals, as for example 472, is depicted in detail in FIGURE 11 and, as seen therein, comprises a flexible seal 474 of asbestos cloth with a resilient wire core 476 contained as shown adjacent one extremity thereof. The said seal is attached to a seal mounting block 479 on the outer casing 70 by a seal plate 477 and a shake-proof lockwasher 478 positioned thereover, and a cap screw 480 extending therebetween, and extends into a groove provided therefor in the exhaust diffuser 88 of the inner casing 72. The seal 474 is retained in the groove in the exhaust diffuser 88 by a seal cover 482 and shake-proof lockwasher 483 positioned thereover, and an attendant screw 484 extending therebetween. The flexible nature of the seal 474 may be readily understood to permit relative movement between the exhaust diffuser 88 and the outer casing 70, while at the same time preventing the escape of the hot gases from the latter. In addition, a guide groove 486 is formed as shown in the exhaust diffuser 88 and a portion 488 of the outer casing 70 extended thereinto to limit the extent of relative longitudinal movement between the said exhaust diffuser and outer casing.

A housing 490 (FIGURE 2) is provided to protectively enclose the journal bearing case 206 of the power recovery turbine 28 and is supported in the depicted position thereof from a soleplate 282 by support members 492 extending therebetween. Spaced support platforms 494 and 496 (FIGURE 3) are provided on each of the outer soleplates 282 to provide support bases for the support members 276 and 492 (FIGURE 2) which in turn support the housings 274 and 490, and spaced platforms 498 and 500 are provided to extend with suitable clearances between each of the inner soleplates 282 and provide support bases for the support members 240 which in turn support the housing 238.

In operation, as for example of the fully automatic nature in a peak-shaving situation, the power peaking unit 20 may be left completely unattended and not operating, with sufficient quantities of fuel and lubricant, and compressed air for starting purposes, provided therefor in readiness for any power generation demands thereon.

Once the demand for electrical power reaches a predetermined level in relation to the electrical power generation capacity of the available, everyday electrical power generation apparatus in the nature of steam turbine or reciprocating engine driven generators, as might occur. For example on a particularly hot and humid summer day due to the extensive use of air-conditioning apparatus, the automatic control means incorporated within the control housing 50 (FIGURE 1) will be automatically activated to automatically start the aircraft type gas turbines 32–46 and rapidly bring the respective power recovery turbines 22, 24, 26 and 28 up to operating speed of 3600 r.p.m., and shortly thereafter—due to the non-illustrated flexible couplings between the inside power recovery turbines 24 and 26 and the A.-C. generator 30—to bring the said generator up to the same operating speed within six minutes from the starting of the said aircraft type gas turbines.

For the power recovery turbines 22, 24, 26 and 28 of the power peaking unit 20, this requires that the said power recovery turbines be brought from the cold conditions thereof to the full load conditions thereof at maximum operating temperatures, as for example 1250° F. to 1300° F. at the nozzle blades 124, within this same short period of time without the development of damaging thermal stresses therein, whereby may be appreciated the significance of the provisions for independent, controlled thermal expansion of the inner and outer casings 72 and 70, respectively, and the thermal stress and heat conductivity resistant construction of the rotor assembly 74, all as described in detail hereinabove.

As the generator 30 reaches operating speed with attendant electrical power output sufficient to meet peak load requirements, the necessary synchronization and voltage regulation functions are automatically performed by the said control means, whereby the power peaking unit 20 is automatically switched on the line to deliver the necessary peak-shaving power thereto.

As soon as the demand for peak-shaving power terminates, the operational process is automatically reversed with the power peaking unit 20 being automatically removed from the line and shut down to remain unattended and in complete readiness for the next demand thereon.

It is, of course, to be clearly understood that other conditions, as for example a break-down in the normal operation of the available, everyday electrical power generation apparatus, can result in an electrical power demand-supply ratio requiring temporary, automatic operation of the power peaking unit 20 as above, until the said break-down has been satisfactorily repaired.

It is also to be clearly understood that, although the power peaking unit 20 is designed primarily for power generation applications of relatively short duration, the reliability, economy and durability inherent in the design and construction thereof make it ideal for long term, continuous service in the generation of electrical power.

With reference to peak-shaving or similar applications, it is believed of interest to note that the power peaking unit 20 provides an almost immediately available source of additional electrical power in excess of 135,000 kw. for a fraction of the fabrication, installation and maintenance costs which would be involved in the provision of additional, peak-shaving or similarly intended electrical power generation apparatus in the nature of steam turbine or reciprocating engine driven electrical generators with comparable power output capacities.

It will be understood that the invention is not to be limited to the specific construction or arrangement of parts shown but that they may be widely modified within the invention defined by the claims.

What is claimed is:

1. In a fluid turbine which is supported from fixed base means, outer casing means, inner casing means positioned within said outer casing means, rotor means rotatably positioned within said inner casing means and forming fluid flow passages in cooperation therewith, and support means and guide means for independently supporting and guiding each of said outer casing means and said inner casing means from said fixed base means with freedom for controlled, relative movement therebetween, said guide means including locating means for positively locating said outer and inner casing means at one common, central point.

2. In a fluid turbine as in claim 1 wherein, said support means for said outer casing means comprise support post means which extend between opposite ends of said outer casing means, and said fixed base means, respectively, said support post means being pivotally attached to both said outer casing means and said fixed base means, whereby controlled movement of said outer casing means relative to said inner casing means, and said fixed base means, is made possible.

3. In a fluid turbine as in claim 1 wherein, said support means for said inner casing means comprise inherently flexible wobble plate means which extend between opposite ends of said inner casing means and said fixed base means, respectively, whereby controlled movement of said inner casing means relative to said outer casing means, and said fixed base means, is made possible.

4. In a fluid turbine as in claim 1 further comprising, means to support and guide said rotor means from said inner casing means with freedom for controlled, relative movement therebetween.

5. In a fluid turbine as in claim 1 wherein, said guide means for said inner casing means extend in part through said outer casing means, with clearance therebetween, and wherein said fluid turbine further comprises flexible seal means cooperatively associated with said outer and inner casing means at the locations where said inner casing means guide means extend through said outer casing means, whereby the escape of fluid from said outer casing means is prevented at the said locations, and relative controlled movement between said outer and inner casing means is made possible at the said locations.

6. In a fluid turbine as in claim 1 wherein, said inner casing means comprise fluid inlet and guide means which extend in part through said outer casing means with clearance therebetween, for admitting and guiding fluid to and through said fluid flow passages, and said outer casing means include fluid exhaust and guide means for receiving fluid from said fluid flow passages and guiding said fluid for the exhaust thereof from said fluid turbine.

7. In a fluid turbine as in claim 2 wherein, said support means for said inner casing means comprise inherently flexible wobble plate means which extend between opposite ends of said inner casing means and said fixed base means, respectively, whereby controlled movement of said inner case means relative to said outer casing means, and said fixed base means, is made possible.

8. In a fluid turbine as in claim 4 wherein, said means to support and guide said rotor means from said inner casing means comprise cooperatively associated support flange means which extend from said inner casing means and said rotor means, respectively, with clearance therebetween in at least one direction, and attachment means to secure said support flange means together with freedom for controlled, relative movement therebetween.

9. In a fluid turbine as in claim 6 wherein, said fluid turbine further comprises flexible seal means cooperatively associated with said outer and inner casing means at the locations wherein said fluid inlet and guide means extend through said outer casing means, whereby the escape of fluid from said outer casing means is prevented at the said locations, and relative movement between said outer and inner casing means is made possible at the said locations.

10. In a fluid turbine as in claim 7 wherein, said guide means for said inner casing means extend in part through said outer casing means, with clearance therebetween, and wherein said fluid turbine further comprises flexible seal means cooperatively associated with said outer and inner casing means at the locations where said inner casing means, guide means extend through said outer casing means, whereby the escape of fluid from said outer casing means is prevented at the said locations, and relative movement between said outer and inner casing means is made possible at the said locations.

11. In a double flow, fluid turbine which is supported from fixed base means, symmetrical outer casing means, symmetrical inner casing means positioned within said outer casing means, double flow rotor means rotatably positioned within said inner casing means and forming oppositely directed fluid flow passages in cooperation therewith, and support means and guide means for independently supporting and guiding each of said outer casing means and said inner casing means from said fixed base means with freedom for controlled, relative movement therebetween, said guide means including locating means for positively locating said outer and inner casing means at one common, central point.

12. In a double flow, fluid turbine as in claim 11 wherein, said support means for said outer casing means comprise support post means which extend between opposite ends of said outer casing means, and said fixed base means, respectively, said support post means being pivotally attached to both said outer casing means and said fixed base means, whereby controlled, movement of outer casing means relative to said inner casing means, and said fixed base means, is made possible.

13. In a double flow, fluid turbine as in claim 11 wherein, said support means for said inner casing means comprise inherently flexible wobble plate means which extend between opposite ends of said inner casing means and said fixed base means, respectively, whereby controlled movement of said inner case means relative to said outer casing means, and said fixed base means, is made possible.

14. In a double flow, fluid turbine as in claim 11 wherein, said inner casing means comprise centrally located, torus-like fluid inlet case means, and symmetrically shaped exhaust diffuser means attached to and extending from both sides of said fluid inlet case means.

15. In a double flow, fluid turbine as in claim 14 wherein, said inner casing means further comprise volute-like inner casing liner means positioned within said fluid inlet case means in spaced relationship thereto for directing fluid to said rotor means.

16. In a double flow, fluid turbine as in claim 15 wherein, said inner case liner means comprise spaced apertures, formed therein, whereby the fluid pressure between the respective interiors of said inner case liner means, and the interior of said gas inlet case, is substantially equalized.

17. In a double flow, fluid turbine as in claim 12 wherein, said support means for said inner casing means comprise inherently flexible wobble plate means which extend between opposite ends of said inner casing means and said fixed base means, respectively, whereby controlled movement of said inner case means relative to said outer casing means, and said fixed base means, is made possible.

18. In a double flow, fluid turbine as in claim 14 further comprising means to support and guide said double flow rotor means from said inner casing means with freedom for controlled, relative movement therebetween.

19. In a double flow, fluid turbine as in claim 18 wherein, said double flow rotor means comprise bearing case means positioned at opposite ends thereof, and wherein said means to support and guide said rotor means from said inner case means comprise cooperatively associated support flange means which extend from said exhaust diffuser means and said bearing case means, respectively, with clearance therebetween in at least one direction, and attachment means which extend between said respective support flange means to secure said support flange means together with freedom for controlled, relative movement therebetween.

20. In a double flow, fluid turbine as in claim 15 wherein, said inner casing means further comprise radial nozzle vane means positioned in said gas inlet case, with freedom for controlled relative movement therebetween, for directing fluid to said oppositely directed fluid flow passages, and fluid turning vane means supported from said exhaust diffuser means in said oppositely directed flow passages for turning fluid exhausted therefrom and directing it into said outer casing means.

21. In a double flow, fluid turbine as in claim 20 wherein, said inner casing means comprise spaced, oppositely directed fluid inlet means which extend from opposite sides of said fluid inlet case means through opposite sides of said outer casing means, with clearance therebetween, for admitting fluid to said inner case liner means, and said outer casing means include fluid exhaust and guide means for receiving fluid from said oppositely directed fluid flow passages and guiding said fluid for the exhaust thereof from said fluid turbine.

22. In a double flow, fluid turbine as in claim 21 wherein, said guide means for said inner casing means, and said exhaust diffuser means, extend in part through said outer casing means, with clearance therebetween, and wherein said double flow, fluid turbine further comprises flexible seal means cooperatively associated with said outer and inner casing means at the locations where said inner casing means guide means and said respective exhaust diffuser means extend through said outer casing means, and the locations where said spaced, oppositely directed fluid inlet means extend through said outer casing means, whereby the escape of fluid from said outer casing means is prevented at the said locations and relative, controlled movement between said outer and inner casing means is made possible at the said locations.

23. In a double flow, fluid turbine as in claim 22 wherein, said support means for said outer casing means comprise support post means which extend between opposite ends of said outer casing means, and said fixed base means, respectively, said support post means being pivotally attached to both said outer casing means and said fixed base means, whereby controlled movement of said outer casing means relative to said inner casing means, and said fixed base means, is made possible, and wherein said support means for said inner casing means comprise inherently flexible wobble plate means which extend between and are attached to opposite ends of said inner casing means and said fixed base means, respectively, whereby controlled movement of said inner casing means relative to said outer casing means, and said fixed base means, is made possible.

24. In a double flow, fluid turbine which is supported from fixed base means, symmetrical outer casing means, symmetrical inner casing means positioned within said outer casing means, double flow rotor means rotatably positioned within said inner casing means and forming oppositely directed, fluid flow passages in cooperation therewith, and support means and guide means for independently supporting and guiding each of said outer casing means and said inner casing means from said fixed base means with freedom for controlled, relative movement therebetween, said guide means including locating means for positively locating said inner and outer casing means at one common, central point, said inner casing means comprising centrally located, torus-like fluid inlet case means, and symmetrically shaped exhaust diffuser means attached to, and extending in opposite directions from, opposite sides of said fluid inlet case, said exhaust diffuser means extending in part through said outer casing means, said support means for said inner casing means comprising spaced, support flanges extending from said exhaust diffuser means to without said outer casing means, and inherently flexible wobble plate means which extend between and are attached to said support flanges and fixed base means, respectively, whereby controlled movement of said inner casing means relative to said outer casing means, and fixed base means, is made possible.

25. In a double flow, fluid turbine as in claim 24 wherein, said support means for said outer casing means comprise spaced, support flanges extending from opposite ends of said outer casing means and having sockets formed therein, correspondingly spaced support platforms mounted on said fixed base means and having sockets formed therein, and support post means having ball-like attachment members formed at opposite extremities thereof, said support post means extending between said support flanges on said outer casing means and said support platforms, respectively, with ball-like attachment members being rotatably positioned in said sockets, whereby controlled movement of said outer casing means relative to said inner casing means, and said fixed base means, is made possible.

26. In a double flow, fluid turbine as in claim 25 wherein, said locating means comprise centrally located centering pin support means which extend from said fixed base through said outer casing means with clearance therebetween, centrally located guide aperture formed in said gas inlet case means, said guide aperture being in alignment with said centering pin support means, centering pin means which extend slidably into said guide aperture from said centering pin support means, and flexible seal means, including a positive locating member, cooperatively associated with said outer casing means and said centering pin support means, whereby said inner and outer casing means are positively located relative to said fixed base means by said centering pin support means and centering pin means.

27. In a double flow, hot gas expander turbine which is supported from fixed base means for use in the recovery of power from the hot exhaust gases of two aircraft type gas turbines, symmetrical outer casing means, symmetrical inner casing means positioned within said outer casing means, double flow rotor means rotatably positioned within said inner casing means and supported therefrom with freedom for controlled, relative movement therebetween, said rotor means forming oppositely directed hot gas flow passages in cooperation with said inner casing means, and support means and guide means for independently supporting and guiding each of said outer casing means and said inner casing means from said fixed base means with freedom for controlled, relative movement therebetween, said inner casing means comprising spaced, oppositely directed hot gas inlet means which extend therefrom through opposite sides of said outer casing means into cooperative association with the exhaust ends of said aircraft type gas turbines for admitting the hot exhaust gases therefrom to said hot gas expander turbine, and said outer and inner casing guide means including locating means for positively locating said outer and inner casing means at one common, central point.

28. In a double flow, hot gas expander turbine as in claim 27 wherein, said inner casing means further comprise centrally located, torus-like hot gas inlet case means, symmetrically shaped exhaust diffuser means attached to and extending in opposite directions from opposite sides of said hot gas inlet case means, and volute-like inner casing liner means positioned within said hot gas inlet case means in spaced relationship thereto for directing hot gases from said hot gas inlet means to said oppositely directed hot gas flow passages.

29. In a double flow, hot gas expander turbine as in claim 28 wherein, said inner casing means further comprise radial nozzle vane means positioned in said hot gas inlet case, with freedom for controlled, relative movement therebetween, and hot gas turning vane means supported from said exhaust diffuser means at the exhaust ends of said oppositely directed hot gas flow passages for turning hot gases exhausted therefrom into said outer casing means.

30. In a double flow, hot gas expander turbine as in claim 29 wherein, said guide means for said inner casing means, and said exhaust diffuser means extend in part through said outer casing means, with clearance therebetween, and wherein said double flow, hot gas turbine further comprises flexible seal means cooperatively associated with said outer and inner casing means at the locations where said inner casing means guide means, said exhaust diffuser means, and said spaced, oppositely directed hot gas inlet means, respectively, extend through said outer casing means, whereby the escape of hot gases from said outer casing means at the said locations is prevented at the said locations, and controlled, relative movement between said outer and inner casing means is made possible at the said locations.

31. In an electrical power generation unit which is supported from fixed base means for electrical power generation use through the recovery of power from the hot exhaust gases of a plurality of aircraft type gas turbines, a double flow, hot gas expander turbine, electrical power generation means, means to drivingly couple said hot gas expander turbine to said electrical power generation means, said hot gas expander turbine comprising symmetrical outer casing means, symmetrical inner casing means positoned within said outer casing means, double flow rotor means rotatably positioned within said inner casing means and supported therefrom with freedom for controlled, relative movement therebetween, said rotor means forming oppositely directed, hot gas flow passages in cooperation with said inner casing means, and support means and guide means for independently supporting and guiding each of said outer casing means and said inner casing means from said fixed base means with freedom for controlled, relative movement therebetween, said inner casing means comprising first and second spaced, oppositely directed hot gas inlet means which extend therefrom through opposite sides of said outer casing means into cooperative association with the exhaust ends of first and second of said aircraft type gas turbines for admititng the hot exhaust gases therefrom to said hot gas expander turbine, and said outer and inner casing means guide means including locating means for positively locating said outer and inner casing means at one common, central point.

32. In an electrical power generation unit as in claim 31 wherein, said means to drivingly couple said hot gas expander turbine to said electrical power generation means comprise flexible coupling means for driving said electrical power generation means at the operational speed of said hot gas expander turbine.

33. In an electrical power generation unit as in claim 31 wherein, said electrical power generation means comprise an air-cooled, A.-C. generator, whereby no external water supply is necessary to the operation of said unit.

34. In an electrical power generation unit as in claim 31 further comprising, housing means for protectively enclosing said electrical power generation means, said double flow, hot gas turbine, and said aircraft type gas turbines, said housing means including silencing means for silencing the intake of air to said aircraft type gas turbines and silencing means for silencing the exhaust of air from said double flow, hot gas turbines, whereby operation of said electrical power generation unit is made possible.

35. In an electrical power generation unit which is supported from fixed base means for electrical power generation use through the recovery of power from the hot exhaust gases of a plurality of aircraft type gas turbines, a double flow, hot gas expander turbine, electrical power generation means, means to drivingly couple said hot gas expander turbine to said electrical power generation means, said hot gas expander turbine comprising outer casing means, inner casing means positioned within said outer casing means, rotor means rotatably positioned within said inner casing means and forming hot gas flow passages in cooperation therewith and support means and guide means for independently supporting and guiding each of said outer casing means and said inner casing means from said fixed base means with freedom for controlled relative movement therebetween, said guide means including locating means for positively locating said outer and inner casing means at one common, central point, and said inner casing means, comprising hot gas inlet means which extend therefrom through opposite sides of said outer casing means into cooperative association with the exhaust ends of first and second of said aircraft type gas turbines for admitting the hot exhaust gases therefrom to said hot gas expander turbine.

36. In an electrical power generation unit as in claim 35 wherein, said support means for said outer casing means comprise support post means which extend between opposite ends of said outer casing means, and said fixed base means, respectively, said support post means being pivotally attached to both said outer casing means and said fixed base means, whereby controlled movement of said outer casing means relative to said inner casing means, and said fixed base means, is made possible.

37. In an electrical power generation unit as in claim 36 wherein, said support means for said inner casing means comprise inherently flexible wobble plate means which extend between opposite ends of said inner casing means and said fixed base means, respectively, whereby controlled movement of said inner casing means relative to said outer casing means, and said fixed base means, is made possible.

References Cited by the Examiner

UNITED STATES PATENTS

| 3,176,958 | 4/1965 | Ryall | 253—39 |
| 3,241,314 | 3/1966 | Fields | 60—39.32 X |

FOREIGN PATENTS 625,377  6/1919  Great Britain.

MARTIN P. SCHWADRON, *Primary Examiner.*

E. A. POWELL, Jr., *Assistant Examiner.*